UNITED STATES PATENT OFFICE.

EDWARD GOODRICH ACHESON, OF STAMFORD TOWNSHIP, WELLAND COUNTY, ONTARIO, CANADA.

METHOD OF PREPARING A PASTE OR CAKE OF DEFLOCCULATED MATERIAL.

No. 895,063.

Specification of Letters Patent.

Patented Aug. 4, 1908.

Application filed October 28, 1907. Serial No. 399,435.

*To all whom it may concern:*

Be it known that I, EDWARD GOODRICH ACHESON, a citizen of the United States, residing at Stamford township, in the county of Welland, Province of Ontario, Canada, have invented certain new and useful Improvements in Methods of Preparing a Paste or Cake of Deflocculated Material, of which the following is a specification.

In my prior patent, No. 843,426, granted February 5, 1907, I have described and claimed a method of disintegrating and deflocculating amorphous bodies by incorporating with them a solution having effects thereon like those due to tannin. The method of deflocculation is usually practiced by incorporating with the amorphous body an aqueous solution containing tannin or equivalent reagent, and the resulting deflocculated material is so finely subdivided as to be capable of remaining in suspension for an indefinite period, and of passing through the finest filter paper. As described in said prior patent the amorphous body to be deflocculated, in powdered form, is usually moistened or wetted with a solution of the modifying material—such as gallotannic acid, catechu, or the like—and the mass is thoroughly worked as by means of a mortar or pugging-mill or the like. When an especially pure, fine and uniform product is desired the material as it comes from the mortar or other grinding machine is diluted with water or other liquid in a suitable vessel, and the fine, disintegrated and deflocculated particles of the body undergoing treatment are suspended in the liquid and may be caused to float into another vessel or tank, and this may be repeated one or more times.

Inasmuch as the suspended particles are capable as above stated of passing through the finest filter paper or like media, it is impossible to collect them or to separate them from the suspending liquid by any of the ordinary filtration methods, or by the use of the usual filtering media; and by reason of the fact that the particles remain in suspension for indefinite time the collecting methods involving settling and decantation are obviously inapplicable.

As described in said prior patent the material may be collected by first flocculating it, but for many purposes, as for the preparation of lubricants, inks, paints, and the like, it is desirable that the deflocculated body should be collected in the form of a paste or cake usually retaining more or less of the suspending liquid without destroying its deflocculated character.

The object of the present invention is the provision of a method of collecting and recovering the deflocculated bodies.

I have discovered that while the suspended deflocculated body is capable as above stated of traversing the finest filter paper, it is not capable of passing through a paper or fabric after the same has been subjected to suitable treatment to provide it with a superficial coating or film, or with a filling, of or containing a colloidal body. The word colloidal is employed in contradistinction to crystalloid, to indicate the class of materials which like rubber, viscose, nitrocellulose, cellulose esters, or compounds, etc., etc., are capable of yielding coherent films when deposited from solution. Thus I have discovered that if ordinary filtering cloths be treated with a solution of rubber in any of its volatile solvents, either by immersing the cloths in the solution or brushing them with the solution, they are rendered capable of retaining the deflocculated body while permitting the passage of the suspending liquid: and that by filtering the liquid through cloths so treated the suspended material is recovered in the form of a cake or paste without destruction or modification of its deflocculated character. As above stated other materials having like rubber the property of separating from solutions in the form of films may be used.

Instead of treating the cloth or other filtering medium with a solution of rubber or equivalent material, it is quite possible to treat the filtering medium, more particularly when the same comprises a cellulose base, with a reagent or reagents capable of effecting a more or less complete transformation or modification of its substance and the development in place of a surface or film of cellulose, cellulose esters, or other products having the desired properties.

I claim:

1. The method of preparing a paste or cake of deflocculated material which consists in first preparing a suspension containing a deflocculated body by treating the body with a material having effects thereon like those due to tannin, and then separating the suspending liquid by passing the same through a colloidal filtering medium.

2. The method of preparing a paste or cake of deflocculated material which consists in first preparing a suspension containing a deflocculated body by treating the body with a material having effects thereon like those due to tannin, and then separating the suspending liquid by passing the same through a filtering medium having a colloidal surface or filling.

3. The method of preparing a paste or cake of deflocculated material which consists in first preparing a suspension containing a deflocculated body, and then separating the suspending liquid by passing the same through a filtering medium having a surface or filling of rubber.

In testimony whereof, I affix my signature in presence of two witnesses.

EDWARD GOODRICH ACHESON.

Witnesses:
W. H. ARISON,
H. B. BODINE.